United States Patent
Kwon et al.

(10) Patent No.: US 9,484,560 B2
(45) Date of Patent: Nov. 1, 2016

(54) ELECTRIC DEVICE HAVING A ROUND CORNER AND INCLUDING A SECONDARY BATTERY

(71) Applicant: LG CHEM, LTD., Seoul (KR)

(72) Inventors: Sungjin Kwon, Daejeon (KR); Dong-Myung Kim, Daejeon (KR); Ki Woong Kim, Daejeon (KR)

(73) Assignee: LG Chem, Ltd. (KR)

( * ) Notice: Subject to any disclaimer, the term of this patent is extended or adjusted under 35 U.S.C. 154(b) by 181 days.

(21) Appl. No.: 13/838,871

(22) Filed: Mar. 15, 2013

(65) Prior Publication Data

US 2014/0227573 A1 Aug. 14, 2014

Related U.S. Application Data

(63) Continuation of application No. PCT/KR2013/002125, filed on Mar. 15, 2013.

(30) Foreign Application Priority Data

Feb. 13, 2013 (KR) .................. 10-2013-0015524

(51) Int. Cl.
*H01M 2/10* (2006.01)
*H01M 2/02* (2006.01)

(52) U.S. Cl.
CPC ............ *H01M 2/1022* (2013.01); *H01M 2/022* (2013.01); *H01M 2/0207* (2013.01); *H01M 2/1061* (2013.01); *H01M 2/1077* (2013.01); *H01M 2002/0205* (2013.01)

(58) Field of Classification Search
CPC ........... H01M 2/1022; H01M 2/1077; H01M 2/1016; H01M 2002/0202; H01M 2002/0205
See application file for complete search history.

(56) References Cited

U.S. PATENT DOCUMENTS

| | | | |
|---|---|---|---|
| 2,702,310 A | 2/1955 | Kaye et al. | |
| 3,442,717 A | 5/1969 | Horn et al. | |
| 4,092,464 A | 5/1978 | Dey et al. | |
| 4,964,877 A | 10/1990 | Keister et al. | |
| 5,633,097 A | 5/1997 | Miller | |
| 5,652,074 A | 7/1997 | Larson, III et al. | |
| 6,040,078 A | 3/2000 | Fauteux et al. | |
| 6,224,995 B1 | 5/2001 | Fauteux et al. | |
| 6,300,002 B1 | 10/2001 | Webb et al. | |
| 6,498,951 B1 | 12/2002 | Larson et al. | |
| 6,610,443 B2 | 8/2003 | Paulot et al. | |
| 6,946,220 B2 | 9/2005 | Probst et al. | |
| 7,479,349 B2 | 1/2009 | O'Phelan et al. | |
| 7,595,132 B2 | 9/2009 | Kang et al. | |
| 2001/0005561 A1 | 6/2001 | Yamada et al. | |
| 2002/0119367 A1 | 8/2002 | Watanabe et al. | |
| 2002/0122975 A1 | 9/2002 | Spillman et al. | |
| 2002/0160257 A1 | 10/2002 | Lee et al. | |
| 2003/0013012 A1 | 1/2003 | Ahn et al. | |
| 2003/0039883 A1 | 2/2003 | Notten et al. | |
| 2003/0077509 A1 | 4/2003 | Probst et al. | |
| 2005/0164094 A1 | 7/2005 | Kotato et al. | |
| 2005/0214642 A1 | 9/2005 | Kim et al. | |
| 2006/0172185 A1 | 8/2006 | Mimura | |
| 2006/0275661 A1 | 12/2006 | Kim et al. | |
| 2006/0286456 A1 | 12/2006 | Fu et al. | |
| 2007/0054180 A1* | 3/2007 | Miyajima et al. | 429/96 |
| 2007/0099078 A1 | 5/2007 | Zhang et al. | |
| 2007/0202401 A1 | 8/2007 | Viavattine | |
| 2007/0218355 A1 | 9/2007 | Ryu et al. | |
| 2007/0287064 A1 | 12/2007 | Suzuki et al. | |
| 2008/0137890 A1 | 6/2008 | Petersen et al. | |
| 2009/0075168 A1 | 3/2009 | Lee | |
| 2009/0159582 A1 | 6/2009 | Chami et al. | |
| 2010/0047685 A1 | 2/2010 | Lee et al. | |
| 2010/0112451 A1 | 5/2010 | Shibutani et al. | |
| 2010/0279161 A1 | 11/2010 | Kang et al. | |
| 2010/0319187 A1 | 12/2010 | Kim et al. | |
| 2011/0052952 A1 | 3/2011 | Roh et al. | |
| 2011/0183183 A1 | 7/2011 | Grady et al. | |
| 2011/0274955 A1 | 11/2011 | Park et al. | |
| 2011/0287308 A1 | 11/2011 | Kim et al. | |
| 2012/0015223 A1 | 1/2012 | Bhardwaj et al. | |
| 2012/0015236 A1 | 1/2012 | Spare | |
| 2012/0107654 A1 | 5/2012 | Bhardwaj et al. | |
| 2012/0129037 A1 | 5/2012 | Hohenthanner et al. | |
| 2012/0135299 A1 | 5/2012 | Kwon et al. | |
| 2012/0156551 A1* | 6/2012 | Cho | 429/163 |
| 2012/0183825 A1 | 7/2012 | Lee et al. | |
| 2012/0202105 A1 | 8/2012 | Shinyashiki et al. | |
| 2013/0019732 A1 | 1/2013 | Yotsumoto | |
| 2013/0108906 A1 | 5/2013 | Bhardwaj et al. | |
| 2013/0144167 A1 | 6/2013 | Lee et al. | |
| 2013/0344360 A1 | 12/2013 | Miyajama et al. | |

FOREIGN PATENT DOCUMENTS

| | | |
|---|---|---|
| CN | 1314008 A | 9/2001 |
| CN | 1363121 A | 8/2002 |

(Continued)

OTHER PUBLICATIONS

Inernational Search Report for Application No. PCT/KR2013/001815 dated Jun. 27, 2013.

(Continued)

*Primary Examiner* — Raymond Alejandro
(74) *Attorney, Agent, or Firm* — Lerner, David, Littenberg, Krumholz & Mentlik, LLP (57) ABSTRACT

An electric device has a curved structure formed at at least one position of an outside thereof. At least one secondary battery having an external appearance corresponding to a shape of the curved structure is mounted at the position of the electric device at which the curved structure is formed. The secondary battery is a battery cell having an electrode assembly including a cathode, an anode, and a separator disposed between the cathode and the anode mounted in a battery case or a battery pack having the battery cell mounted in a pack case.

11 Claims, 9 Drawing Sheets

(56) References Cited

FOREIGN PATENT DOCUMENTS

| | | |
|---|---|---|
| CN | 1799162 A | 7/2006 |
| CN | 101107736 A | 1/2008 |
| EP | 1309018 A2 | 5/2003 |
| EP | 1326680 A1 | 7/2003 |
| EP | 1416571 A1 | 5/2004 |
| JP | 02-056856 | 2/1990 |
| JP | 05-234598 | 9/1993 |
| JP | 06-260209 | 9/1994 |
| JP | 08-171930 | 7/1996 |
| JP | 09-063591 | 3/1997 |
| JP | 09-082361 | 3/1997 |
| JP | H10188938 A | 7/1998 |
| JP | 10-270014 | 10/1998 |
| JP | H10296879 A | 11/1998 |
| JP | 2000133317 A | 5/2000 |
| JP | 2001028275 A | 1/2001 |
| JP | 2001167743 A | 6/2001 |
| JP | 2001357892 A | 12/2001 |
| JP | 2002199910 A | 7/2002 |
| JP | 2002252023 A | 9/2002 |
| JP | 2002260600 A | 9/2002 |
| JP | 2002-343350 A | 11/2002 |
| JP | 2003217601 A | 7/2003 |
| JP | 2003523060 A | 7/2003 |
| JP | 2003234094 A | 8/2003 |
| JP | 2003303622 A | 10/2003 |
| JP | 2004111219 A | 4/2004 |
| JP | 3611765 B2 | 1/2005 |
| JP | 2005169728 A | 6/2005 |
| JP | 3680797 B2 | 8/2005 |
| JP | 2006127882 A | 5/2006 |
| JP | 2006134604 A | 5/2006 |
| JP | 2006236994 A | 9/2006 |
| JP | 2006-278331 A | 10/2006 |
| JP | 2007073207 A | 3/2007 |
| JP | 2008021634 A | 1/2008 |
| JP | 2008300141 A | 12/2008 |
| JP | 2009-218105 A | 9/2009 |
| JP | 2010176980 A | 8/2010 |
| JP | 2011003518 A | 1/2011 |
| JP | 2011081931 A | 4/2011 |
| JP | 2011517831 A | 6/2011 |
| JP | 2011204613 A | 10/2011 |
| KR | 2020000005813 U | 4/2000 |
| KR | 20-0207948 | 1/2001 |
| KR | 1020010055968 A | 7/2001 |
| KR | 20010104150 A | 11/2001 |
| KR | 1020030066960 A | 8/2003 |
| KR | 20040054113 A | 6/2004 |
| KR | 20050020357 A | 3/2005 |
| KR | 20050036466 A | 4/2005 |
| KR | 20060027281 A | 3/2006 |
| KR | 100670492 B1 | 1/2007 |
| KR | 20070066401 A | 6/2007 |
| KR | 1020070075941 A | 7/2007 |
| KR | 1020070099068 A | 10/2007 |
| KR | 20080022915 A | 3/2008 |
| KR | 100829553 B1 | 5/2008 |
| KR | 20080058772 A | 6/2008 |
| KR | 20080095967 A | 10/2008 |
| KR | 10-0866767 B1 | 11/2008 |
| KR | 20090003823 A | 1/2009 |
| KR | 10-0884945 B1 | 2/2009 |
| KR | 20090028243 A | 3/2009 |
| KR | 20090062409 A | 6/2009 |
| KR | 20090097731 A | 9/2009 |
| KR | 100987300 B1 | 10/2010 |
| KR | 20100137290 A | 12/2010 |
| KR | 20110025023 A | 3/2011 |
| KR | 20110105737 A | 9/2011 |
| KR | 20110112241 A | 10/2011 |
| KR | 20110128594 A | 11/2011 |
| KR | 20120060706 A | 6/2012 |
| KR | 20120082808 A | 7/2012 |
| WO | 0072392 A1 | 11/2000 |
| WO | 0243178 A1 | 5/2002 |
| WO | 2012-009423 A1 | 1/2012 |
| WO | 2012053772 A2 | 4/2012 |
| WO | 2013054593 A1 | 4/2013 |
| WO | 2013141279 A1 | 9/2013 |
| WO | 2013-180378 A1 | 12/2013 |

OTHER PUBLICATIONS

International Search Report for Application No. PCT/KR2013/002118 dated Jun. 28, 2013.
International Search Report for Application No. PCT/KR2013/002127 dated Jun. 27, 2013.
Chinese Office Action for Application No. 201380002792.X dated Apr. 3, 2015.
Machine translation of KR 2003-0066960 (Jang).
International Search Report from PCT/KR2013/002125, dated Jun. 26, 2013.
Extended Search Report from European Application No. 13797719.5, dated Feb. 12, 2016.

* cited by examiner

ELECTRIC DEVICE HAVING A ROUND CORNER AND INCLUDING A SECONDARY BATTERY

This application is a Continuation of PCT International Application No. PCT/KR2013/002125 filed on Mar. 15, 2013, which claims priority under 35 U.S.C 119(a) to Application No. 10-2013-0015524 filed in Republic of Korea on Feb. 13, 2013, all of which are hereby expressly incorporated by reference into the present application.

TECHNICAL FIELD

The present invention relates to an electric device having a round corner and, more particularly, to an electric device having a curved structure formed at at least one position of an outside thereof, wherein at least one secondary battery having an external appearance corresponding to a shape of the curved structure is mounted at the position of the electric device at which the curved structure is formed and wherein the secondary battery is a battery cell having an electrode assembly including a cathode, an anode, and a separator disposed between the cathode and the anode mounted in a battery case or a battery pack having the battery cell mounted in a pack case.

BACKGROUND ART

As electric devices have been increasingly developed, and the demand for such electric devices has increased, the demand for secondary batteries has also sharply increased in recent years. In addition, new forms of secondary batteries have been required according to various trends in design including a slim type structure or a curved structure of electric devices.

According to such various trends in design, electric devices have been designed such that at least one portion of the outside of each of the electric devices is curved unlike a conventional simple rectangular parallelepiped structure. In addition, each of such electric devices is provided with a larger number of electronic components than conventional electric devices. For this reason, secondary batteries which are more stable and have increased electric capacities are required. Among such secondary batteries is a lithium secondary battery exhibiting high energy density and operating voltage and excellent charge retention and service-life characteristics. The lithium secondary battery has been widely used as an energy source for various electronic products as well as electric devices.

Based on the appearance thereof, the lithium secondary battery may be classified as a cylindrical battery, a prismatic battery, or a pouch-shaped battery. Based on the kind of an electrolyte, the lithium secondary battery may also be classified as a lithium ion battery, a lithium ion polymer battery, or a lithium polymer battery.

A recent trend in the miniaturization of electric devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

Generally, a pouch-shaped battery is a battery having an electrode assembly and an electrolyte in a pouch-shaped battery case, formed of a laminate sheet including a resin layer and a metal layer, in a sealed state. The electrode assembly mounted in the battery case is configured in a jelly-roll (wound) type structure, a stacked type structure, or a combination (stacked/folded) type structure.

Figure 1:
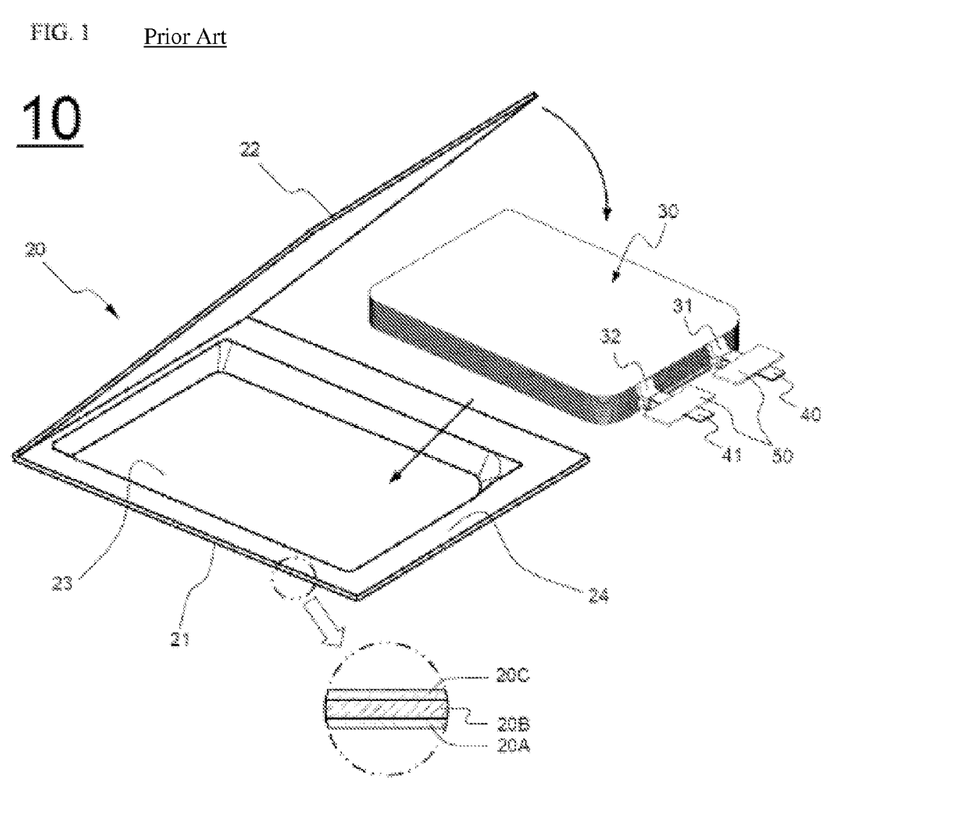
FIG. 1 is an exploded perspective view showing a conventional battery cell.

FIG. 1 is a view typically showing the structure of a pouch-shaped secondary battery including a stacked type electrode assembly.

Referring to FIG. 1, a pouch-shaped secondary battery 10 is configured to have a structure in which an electrode assembly 30, including cathodes, anodes and separators disposed respectively between the cathodes and the anodes, is mounted in a pouch-shaped battery case 20 in a sealed state such that a cathode lead 40 and an anode lead 41 electrically connected to cathode tabs 31 and anode tabs 32 of the electrode assembly 30 are exposed to the outside.

The battery case 20 includes a case body 21 having a depressed receiving part 23, in which the electrode assembly 30 is located, and a cover 22 integrally connected to the case body 21.

The battery case 20 is formed of a laminate sheet including an outer resin layer 20A constituting the outermost portion of the laminate sheet, an isolation metal layer 20B to prevent penetration of materials, and an inner resin layer 20C for sealing.

The cathode tabs 31 and the anode tabs 32 of the stacked type electrode assembly 30 are respectively coupled to the electrode leads 40 and 41 by welding. In addition, insulative films 50 are attached to the top and bottom of each of the electrode leads 40 and 41 to prevent the occurrence of a short circuit between a thermal welding device (not shown) and the electrode leads 40 and 41 and to achieve sealing between the electrode leads 40 and 41 and the battery case 20 when the upper end 24 of the case body 21 and the upper end of the cover 22 are thermally welded to each other using the thermal welding device.

However, the above-mentioned pouch-shaped secondary battery is generally configured to have a simple rectangular parallelepiped structure. In a case in which the pouch-shaped secondary battery is mounted in various designs of electric devices each having a curved structure, therefore, the inner space of each of the electric devices cannot be fully used or unnecessary dead spaces may be formed in each of the electric devices. In addition, such inefficient use of the inner space of each of the electric devices may increase overall volume of each of the electric devices.

Therefore, there is a high necessity for an electric device configured to have an external appearance based on various designs including a curved structure and to have a secondary battery that is capable of efficiently using the inner space of the electric device mounted therein.

DISCLOSURE

Technical Problem

Therefore, the present invention has been made to solve the above problems, and other technical problems that have yet to be resolved.

Specifically, it is an object of the present invention to provide an electric device configured to have an external appearance based on various designs including a curved structure and to have a secondary battery that is capable of efficiently using the inner space of the electric device mounted therein.

It is another object of the present invention to provide a secondary battery having a structure capable of efficiently using the inner space of the electric device.

Technical Solution

In accordance with one aspect of the present invention, the above and other objects can be accomplished by the provision of an electric device having a curved structure formed at at least one position of an outside thereof, wherein at least one secondary battery having an external appearance corresponding to a shape of the curved structure is mounted at the position of the electric device at which the curved structure is formed and wherein the secondary battery is a battery cell having an electrode assembly including a cathode, an anode, and a separator disposed between the cathode and the anode mounted in a battery case or a battery pack having the battery cell mounted in a pack case.

The electrode assembly may include a stacked type electrode assembly. The number of electrode groups constituting the electrode assembly may be flexibly adjusted by those skilled in the art based on the shape or required capacity of a device in which the battery cell is mounted. For example, the electrode assembly may include two or three electrode groups. Alternatively, the electrode assembly may include four or more electrode groups.

The stacked type electrode assembly may include a first electrode group configured to have a structure in which a cathode plate, an anode plate, and separator plates are laminated while being stacked such that the cathode plate or the anode plate and one of the separator plates are located at the outermost sides of the stacked type electrode assembly.

In addition, the stacked type electrode assembly may include a second electrode group configured to have a structure in which a cathode plate, an anode plate, and separator plates are laminated while being stacked such that the separator plates are located at the outermost sides of the stacked type electrode assembly.

For example, the first electrode group may be configured to have a structure in which a cathode plate, a separator plate, an anode plate, and a separator plate are laminated while being sequentially stacked or a structure in which an anode plate, a separator plate, a cathode plate, and a separator plate are laminated while being sequentially stacked.

The stacked type electrode assembly may include a third electrode group configured to have a structure in which a cathode plate, an anode plate, and a separator plate are laminated while being stacked in a state in which the separator plate is disposed between the cathode plate and the anode plate such that the cathode plate and the anode plate are located at the outermost sides of the stacked type electrode assembly.

The stacked type electrode assembly may include a fourth electrode group configured to have a structure in which a cathode plate or an anode plate and a separator plate are laminated while being stacked.

The stacked type electrode assembly may be configured to have a structure in which only first electrode groups are stacked, a structure in which only second electrode groups are stacked, a structure in which only third electrode groups are stacked, a structure in which only fourth electrode groups are stacked, or a structure in which the first, second, third, and fourth electrode groups are combined.

The second electrode group may be stacked at the uppermost end or the lowermost end of the first electrode group.

In the structure in which only the second electrode groups are stacked, a cathode plate or an anode plate may be disposed between the second electrode groups.

A fixing member to more securely maintain the stack structure of the cathode plate, the separator plate, and the anode plate may be added to the first electrode group to the fourth electrode group.

The fixing member may be an additional external member different from the first electrode group to the fourth electrode group. The fixing member may be an adhesive tape or a bonding tape to cover a portion or the entirety of the outside of each of the electrode groups.

The outside of each of the electrode groups may include sides, a top, a front, and a rear of each of the electrode groups.

The fixing member may be a portion of the separator plate constituting each of the electrode groups. In this case, the ends of the separator plate may be thermally welded to fix each of the electrode groups. However, the present invention is not limited thereto.

Ends of the separator plate may extend such that the separator plate has a length larger than the size of the cathode plate and the anode plate, i.e. the horizontal length or the vertical length. The extending ends of the separator may be connected to each other by thermal welding.

The fixing member may include all members that are capable of fixing the first electrode group to the fourth electrode group.

In a case in which the stacked type electrode assembly is configured to include the first electrode group to the fourth electrode group, it possible to improve productivity and yield as compared with the stacked type electrode assembly configured to have a structure in which the cathode plate, the anode plate, and the separator plate are simply stacked.

In addition, the cathode plate, the separator plate, and the anode plate are laminated in unit of each electrode group, and therefore, it is possible to minimize expansion in volume of the stacked type electrode assembly due to swelling.

In a case in which the stacked type electrode assembly is configured to include the first electrode group and the second electrode group, misalignment of the electrode assembly caused during a folding process is prevented and omission of processing equipment is possible. In addition, it is possible to form the first electrode group or the second electrode group using only one laminator. In addition, it is possible to manufacture the stacked type electrode assembly by simple stacking. Consequently, damage to electrodes caused during the folding process may be reduced and electrolyte wettability may be improved. Furthermore, a single-sided organic and inorganic composite separator, e.g. a safety reinforced separator (SRS), may be used as the separator plate exposed outside. Consequently, cell thickness may be decreased and, at the same time, processing cost may be reduced.

Therefore, the electric device according to the present invention may be manufactured based on various designs including a curved structure and have a secondary battery, the external appearance of which corresponds to the curved structure of the electric device, mounted therein, and therefore, it is possible to efficiently use the inner space of the electric device. Consequently, the electric device according to the present invention may have a compact structure based on various designs while maintaining more stable and increased electrical capacity as compared with the conventional electric device.

In a concrete example, the battery cell may be configured to have a rectangular parallelepiped structure including six faces. Specifically, the battery cell may include a top face and a bottom face having relatively large areas, the top face and the bottom face being opposite to each other, four side faces tangent to the top face and the bottom face, four side edges forming interfaces between the respective side faces, four upper edges forming interfaces between the top face and the respective side faces, and four lower edges forming interfaces between the bottom face and the respective side faces.

In the above structure, a stepped or stair-like structure may be formed at at least one selected from among the upper edges, the lower edges, and the side edges of the battery cell.

In a case in which n electrode groups having different stack areas are stacked, the stair-like structure may have n steps, where, n is a natural number equal to or greater than 2 and may be properly adjusted in consideration of the capacity of a device or the curvature of the outside of the device.

In addition, a round corner having a shape corresponding to the curved structure of the electric device may be formed at at least one selected from among the upper edges, the lower edges, and the side edges of the battery cell.

As a result of forming the round corner, the corresponding edge may be deformed to such an extent that the interface between one face (for example, a first face) and another face (for example, a second face) tangent to the edge cannot be clearly distinguished. For example, the first face may continuously extend to the second face without forming an edge to form the round corner. According to circumstances, the first face and the second face may form a curved face while forming an edge that can be distinguished to some extent to form the round corner.

As described above, the secondary battery, the external appearance of which corresponds to the curved structure of the electric device, is mounted in the electric device having the curved structure formed at at least one position of the outside thereof. In order to efficiently use the inner space of the electric device, the external appearance of the battery cell corresponds to the internal appearance of the electric device, concrete examples of which will hereinafter be described in detail.

In a concrete example, the battery cell may have electrode terminals formed at one side face thereof and a round corner may be formed at at least one side edge of the battery cell which is not tangent to one side face at which the electrode terminals are formed.

The above structure is suitable for an electric device having a round corner formed at at least one side edge thereof in plane. That is, the above structure may extend electrical capacity of the battery cell to the round corner at which a conventional battery cell having a simple rectangular structure in plane cannot be mounted in tight contact. Specifically, it is not possible for the conventional battery cell having the simple rectangular structure in plane to be mounted in a battery cell receiving part having the round corner in tight contact. As a result, a dead space is formed and the dead space may cause the increase in volume of the electric device. In addition, the battery cell may not be stably fixed in the dead space in tight contact with the result that the safety of the electric device may be lowered. Meanwhile, an additional fixing member to fix the battery cell is provided to solve the above-mentioned problem. However, the provision of the additional fixing member may increase the volume and weight of the electric device. On the other hand, the battery cell according to the present invention has a structure in which it is possible to fundamentally prevent formation of such a dead space. On the contrary, the dead space is used to increase electric capacity of the electric device. Consequently, it is possible to stably mount the battery cell in the electric device, thereby solving the structural problems of the conventional battery cell.

In another concrete example, the battery cell may have electrode terminals formed at one side face thereof and a round corner may be formed at one upper edge and/or one lower edge of the battery cell which is not tangent to one side face at which the electrode terminals are formed.

The above structure is suitable for an electric device having a round corner formed at one upper edge and/or one lower edge thereof in side. That is, the above structure may extend electrical capacity of the battery cell to the round corner at which a conventional battery cell having a simple rectangular structure in side cannot be mounted in tight contact.

In another concrete example, the battery cell may have electrode terminals formed at one side face thereof and a round corner may be formed at one upper edge and at least one side edge of the battery cell which are not tangent to one side face at which the electrode terminals are formed such that the top face and at least one side face of the battery cell are connected to each other in a continuously curved form.

The above structure is suitable for an electric device having a round corner formed at at least one side edge thereof in plane and at one upper edge or one lower edge thereof in side. That is, the above structure may extend electrical capacity of the battery cell to the round corner at which a conventional battery cell having a simple rectangular structure in plane and in side cannot be mounted in tight contact. Specifically, the conventional battery cell having the simple rectangular structure in plane and in side generally has a rectangular parallelepiped structure. Consequently, it is not possible for the conventional battery cell having the rectangular parallelepiped structure to be mounted in a space in which one face and another face adjacent to the one face are connected to each other in a continuously curved form in tight contact. On the other hand, the battery cell according to the present invention has a structure in which the battery cell is mounted in a space in which one face and another face adjacent to one face are connected to each other in a continuously curved form in tight contact. Consequently, it is possible to solve the structural problems of the conventional battery cell.

In a further concrete example, the battery cell may have electrode terminals formed at one side face thereof and a round corner is formed at one upper edge, one lower edge, and at least one side edge of the battery cell which are not tangent to the one side face at which the electrode terminals are formed such that the top face, the bottom face, and at least one side face of the battery cell are connected to each other in a continuously curved form.

The above structure is suitable for use in an electric device having a round corner formed at at least one side edge thereof in plane and at one upper edge and one lower edge thereof in side. Specifically, the above structure is a modification of the structure in which the top face and the side face are connected to each other in a continuously curved form as described above. That is, in the above structure, the top face, the bottom face, and the side faces are connected to each other in a continuously curved form. Consequently, the battery cell having the above structure may be stably mounted in electric devices having various structures in which the top face, the bottom face, and the side faces are curved in tight contact.

The above-mentioned various concrete examples include a structure suitable for an electric device having a curved structure formed at at least one position of the outside thereof. In order to apply such a suitable structure to the battery cell, the above-mentioned various concrete examples adopt a method of forming a round corner or a continuously curved form at the top face, the bottom face, the side faces, or the edges of the battery cell.

Specifically, a radius of curvature of the round corner is not particularly restricted so long as the round corner has a size corresponding to the shape of the battery cell installation space of the electric device. For example, the round corner has a radius of curvature of 1 to 200 mm, specifically 1 to 10 mm or 10 to 200 mm. In addition, the round corner may have a radius of curvature equivalent to 20 to 100% of a width (horizontal length) or a length (vertical length) of the electrode assembly in plane. Furthermore, the round corner may be formed in a fixed arc shape having one radius of curvature or in a variable arc shape having two or more radii of curvature.

However, the above-mentioned numerical values and arc shapes are merely some examples. Consequently, the numerical values and arc shapes may be properly changed and designed according to the shape of the battery cell installation space of the electric device.

In a concrete example, the battery case may be formed of a laminate sheet including an outer resin layer constituting the outermost portion of the laminate sheet, an isolation metal layer to prevent penetration of materials, and an inner resin layer for sealing.

The battery cell may be, for example, a pouch-shaped battery cell configured to have a structure in which the electrode assembly is mounted in a pouch-shaped battery case. However, the battery cell according to the present invention is not limited to the pouch-shaped battery cell.

Specifically, the pouch-shaped battery cell may be configured to have a structure in which an electrode assembly of a structure including a cathode, an anode, and a separator disposed between the cathode and the anode is mounted in a battery case formed of a laminate sheet including a resin layer and a metal layer in a state in which the electrode assembly is connected to electrode terminals protruding outward from the battery case.

In addition, the battery cell may be a lithium ion battery or a lithium ion polymer battery. However, the battery cell according to the present invention is not limited to the lithium ion battery or the lithium ion polymer battery.

Meanwhile, the device according to the present invention may be generally configured to have a hexahedral structure corresponding to the shape of the battery cell and the curved structure may be formed at at least one edge or at least one face thereof.

In addition, a preferred example of the device may be selected from among a mobile phone, a portable computer, a laptop computer, a netbook computer, a smartphone, a smart pad, a tablet personal computer (PC), a light electric vehicle (LEV), an electric vehicle, a hybrid electric vehicle, a plug-in hybrid electric vehicle, and a power storage device.

The structure of the device and a method of manufacturing the device are well known in the art to which the present invention pertains, and therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 2:
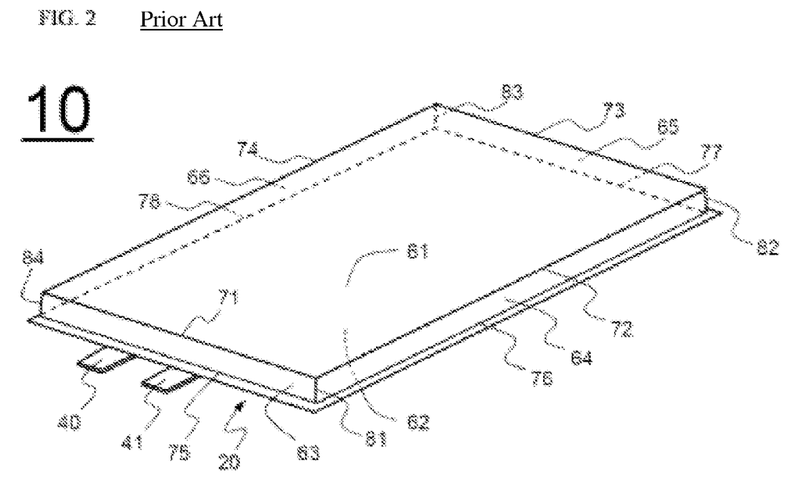
FIG. 2 is a perspective view showing the conventional battery cell.

FIG. 2 is a perspective view showing a conventional battery cell.

Referring to FIG. 2, a conventional battery cell 10 is configured to have a rectangular parallelepiped structure including six faces 61, 62, 63, 64, 65, and 66. Specifically, the battery cell 10 includes a top face 61 and a bottom face 62 having relatively large areas, the top face 61 and the bottom face 62 being opposite to each other, four side faces 63, 64, 65, and 66 tangent to the top face 61 and the bottom face 62, four side edges 81, 82, 83, and 84 forming interfaces between the respective side faces 63, 64, 65, and 66, four upper edges 71, 72, 73, and 74 forming interfaces between the top face 61 and the respective side faces 63, 64, 65, and 66, and four lower edges 75, 76, 77, and 78 forming interfaces between the bottom face 62 and the respective side faces 63, 64, 65, and 66.

An electric device 600 (see FIG. 4) according to the present invention is configured to have curved structures 601, 602, 604, and 605 (see FIG. 4) formed at one or more positions of the outside thereof. In order to maximize of use of the inner space of the electric device, a battery cell 100 (see FIG. 4) formed by modifying the structure of the conventional battery cell 10 as previously described is mounted in the electric device 600.

Specifically, the battery cell 100 (see FIG. 4) according to the present invention is configured to have a structure in which round corners having shapes corresponding to the curved structures 601, 602, 604, and 605 (see FIG. 4) of the electric device 600 (see FIG. 4) are formed at one or more selected from among the upper edges 71, 72, 73, and 74, the lower edges 75, 76, 77, and 78, and the side edges 81, 82, 83, and 84 of the conventional battery cell 10. In order to efficiently use the inner space of the electric device 600 (see FIG. 4), the external appearance of the battery cell 100 (see FIG. 4) corresponds to the internal appearance of the electric device 600 (see FIG. 4), concrete embodiments of which will hereinafter be described in detail with reference to the accompanying drawings.

Figure 3:
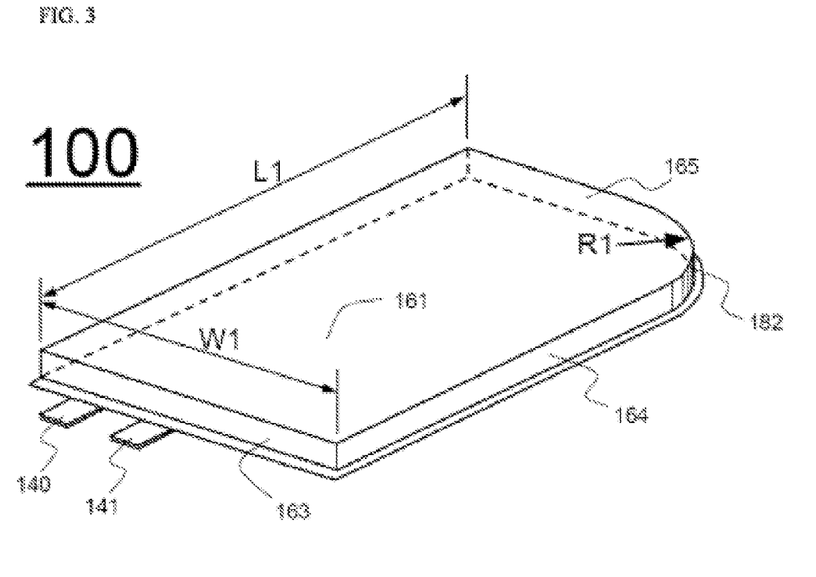
FIG. 3 is a perspective view showing a battery cell according to an embodiment of the present invention.
Figure 4:
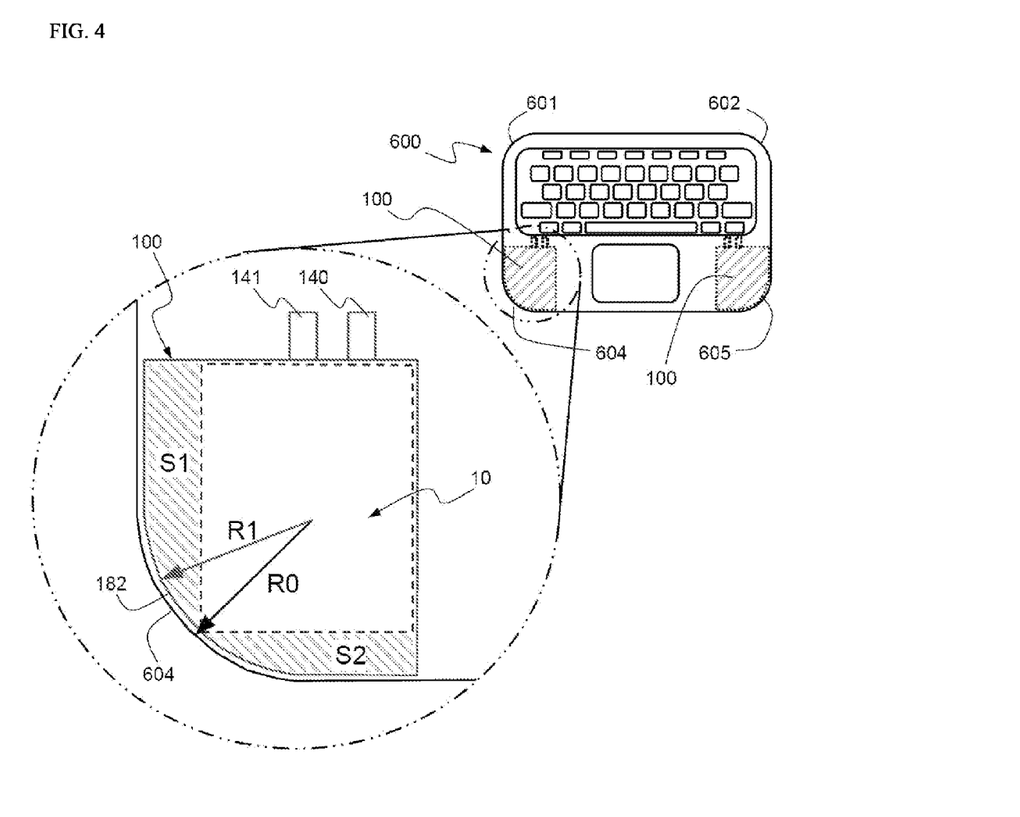
FIGS. 4 and 5 are typical views showing an electric device according to an embodiment of the present invention.
Figure 5:
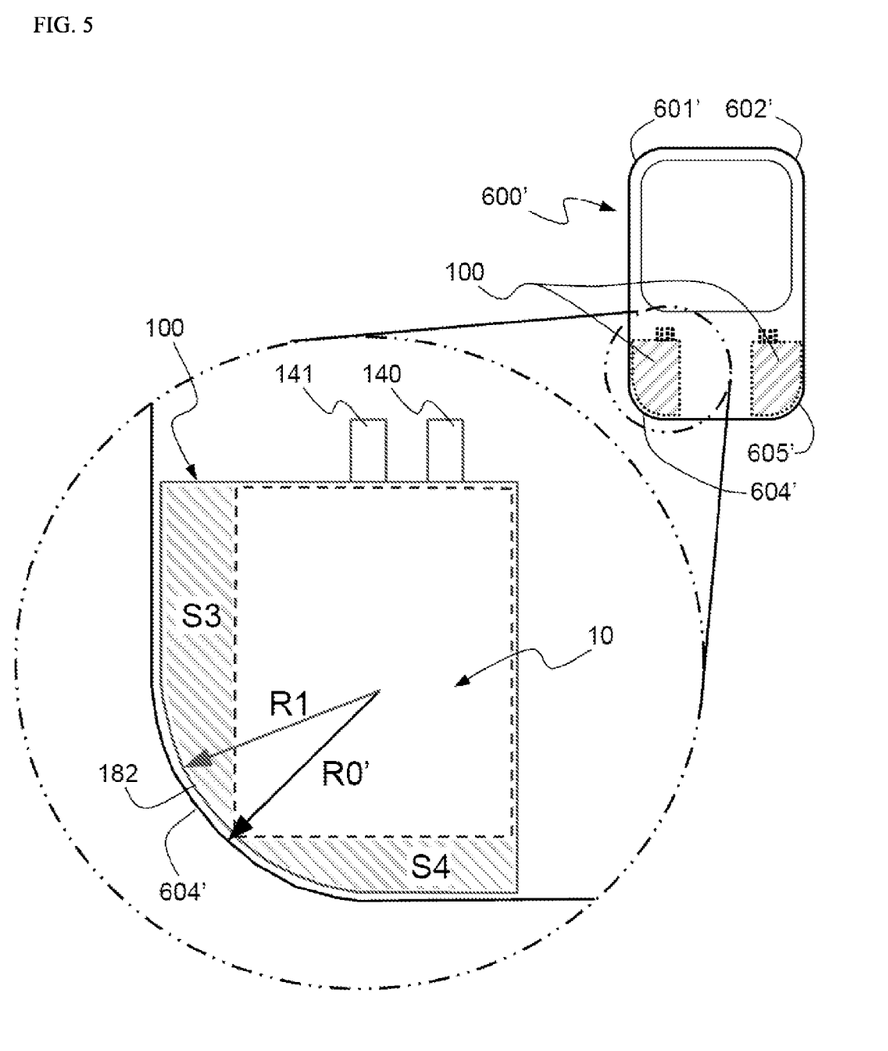

FIG. 3 is a perspective view showing a battery cell according to an embodiment of the present invention, and FIGS. 4 and 5 are typical views showing an electric device according to an embodiment of the present invention.

Referring first to FIG. 3, the battery cell 100 has electrode terminals 140 and 141 formed at one side face 163 thereof. A round corner R1 is formed at one side edge 182 of the battery cell 100 which is not tangent to one side face 163 at which the electrode terminals 140 and 141 are formed.

The round corner has a radius of curvature of, for example, 1 to 200 mm. However, the radius of curvature of the round corner is not limited to the above numerical range. That is, the round corner may be properly modified and designed according to the shape of the battery cell installation space of the electric device. As another example, the radius of curvature of the round corner may be designed to have a size equivalent to 20 to 100% of a width W1 or a length L1 of an electrode assembly (not shown) in plane.

Referring to FIG. 4 together with FIG. 3, curved structures 601, 602, 604 and 605 (see FIG. 4) are formed at four corners of the electric device 600 in plane. In addition, one battery cell 100 is mounted in the inner space of the electric device 600 adjacent to each of the lower corners 604 and 605 of the electric device 600.

Specifically, the battery cell 100 has the round corner 182 corresponding to the curved structure 604 of the electric device 600. As a result, the battery cell 100 is mounted in the inner space of the electric device 600 adjacent to the corner 604 of the electric device 600 in tight contact with the inside of the electric device 600.

In comparison between a case in which the battery cell 100 according to the present invention is mounted in the electric device 600 and a case in which the conventional battery cell 10 is mounted in the electric device 600, the battery cell 100 according to the present invention is mounted in the inner space of the electric device 600 adjacent to the round corner 604 of the electric device 600 in tight contact with the inside of the electric device 600, whereas the conventional battery cell 10 is mounted in the electric device 600 while not being in tight contact with the inside of the electric device 600 with the result that dead spaces S1 and S2 are formed.

Consequently, the battery cell 100 according to the present invention may secure greater electrical capacity than the conventional battery cell 10 through utilization of the dead spaces S1 and S2. In addition, the conventional battery cell 10 is spaced apart from the curved structure 604 of the electric device 600 by the dead spaces S1 and S2 with the result that additional fixing members (not shown) to stably mount the conventional battery cell 10 are necessary. On the other hand, the battery cell 100 according to the present invention is mounted in the electric device 600 in tight contact with the inside of the electric device 600 with the result that additional fixing members (not shown) are not necessary.

Referring to FIG. 5 together with FIG. 4, the electric device 600 of FIG. 4 may be a portable computer, a laptop computer, a netbook computer, a smart pad, or a tablet personal computer (PC), whereas an electric device 600' of FIG. 5 may be a mobile phone or a smartphone. The battery cell 100 mounted in the electric device 600' includes a round corner 182' corresponding to a curved structure 604' of the electric device 600'. Consequently, the battery cell 100 is mounted in the inner space of the electric device 600' adjacent to the corner 604' of the electric device 600' in tight contact with the inside of the electric device 600'.

Consequently, the battery cell 100 according to the present invention may secure greater electrical capacity than the conventional battery cell 10 through utilization of the dead spaces S3 and S4. In addition, the conventional battery cell 10 is spaced apart from the curved structure 604' of the electric device 600' by the dead spaces S3 and S4 with the result that additional fixing members (not shown) to stably mount the conventional battery cell 10 are necessary. On the other hand, the battery cell 100 according to the present invention is mounted in the electric device 600' in tight contact with the inside of the electric device 600' with the result that additional fixing members (not shown) are not necessary.

FIGS. 6 to 9 are perspective views showing battery cells according to other embodiments of the present invention.

Figure 6:
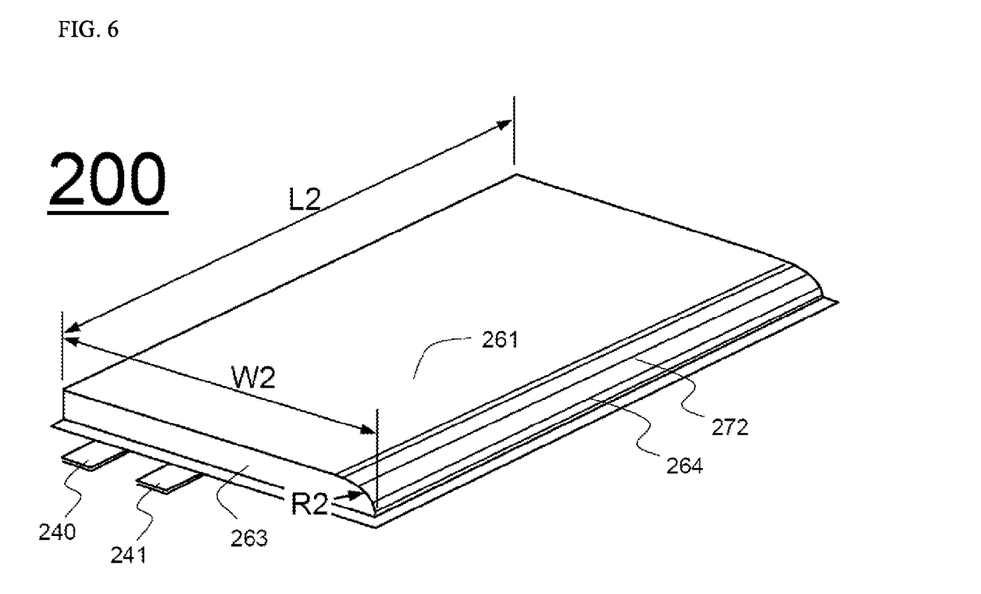
FIGS. 6 to 9 are perspective views showing battery cells according to other embodiments of the present invention.

Referring first to FIG. 6, a battery cell 200 has electrode terminals 240 and 241 formed at one side face 263 thereof. A round corner R2 is formed at an upper edge 272 of the battery cell 200 which is not tangent to one side face 263 at which the electrode terminals 240 and 241 are formed. In other words, the battery cell 200 is generally configured to have a rectangular parallelepiped structure in which a top face 261 and one side face 264 of the battery cell 200 are connected to each other in a continuously curved form.

Figure 7:
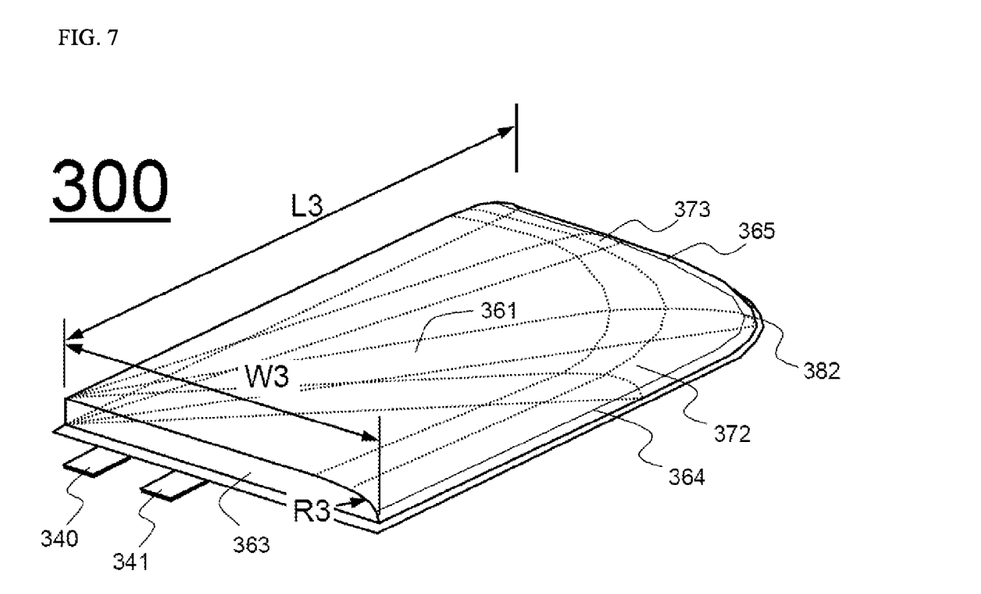

Referring to FIG. 7, a battery cell 300 has electrode terminals 340 and 341 formed at one side face 363 thereof. A round corner R3 is formed at upper edges 372 and 373 and one side edge 382 of the battery cell 300 which are not tangent to one side face 363 at which the electrode terminals 340 and 341 are formed. In other words, the battery cell 300 is generally configured to have a rectangular parallelepiped structure in which a top face 361 and two side faces 364 and 365 of the battery cell 300 are connected to each other in a continuously curved form.

Figure 8:
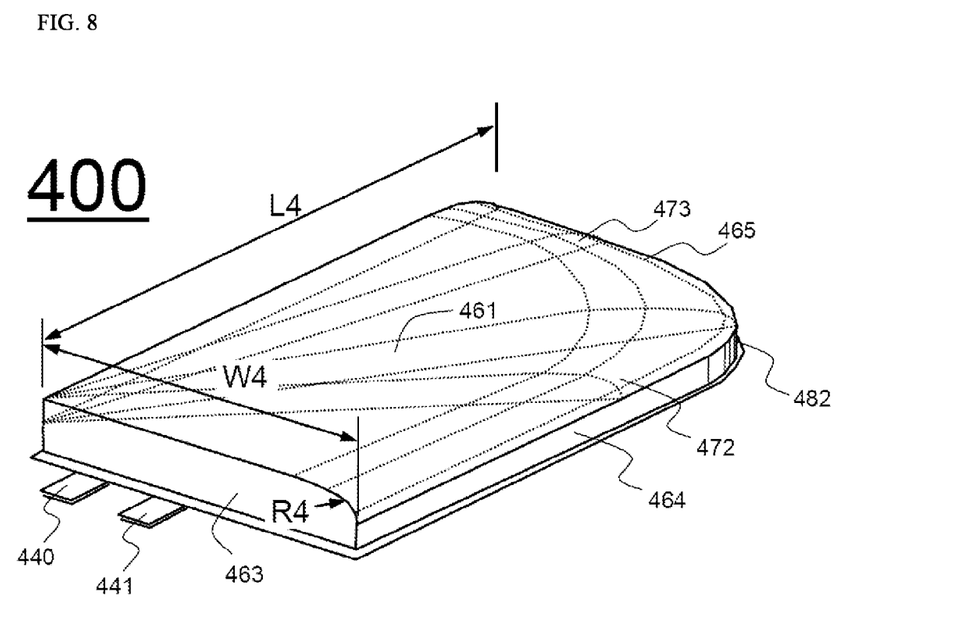

Referring to FIG. 8, a battery cell 400 is basically identical in structure to the battery cell 300 shown in FIG. 7 except that two side faces 464 and 465 of the battery cell 400 extend longer than the side faces 364 and 365 of the battery cell 300 shown in FIG. 7.

Figure 9:
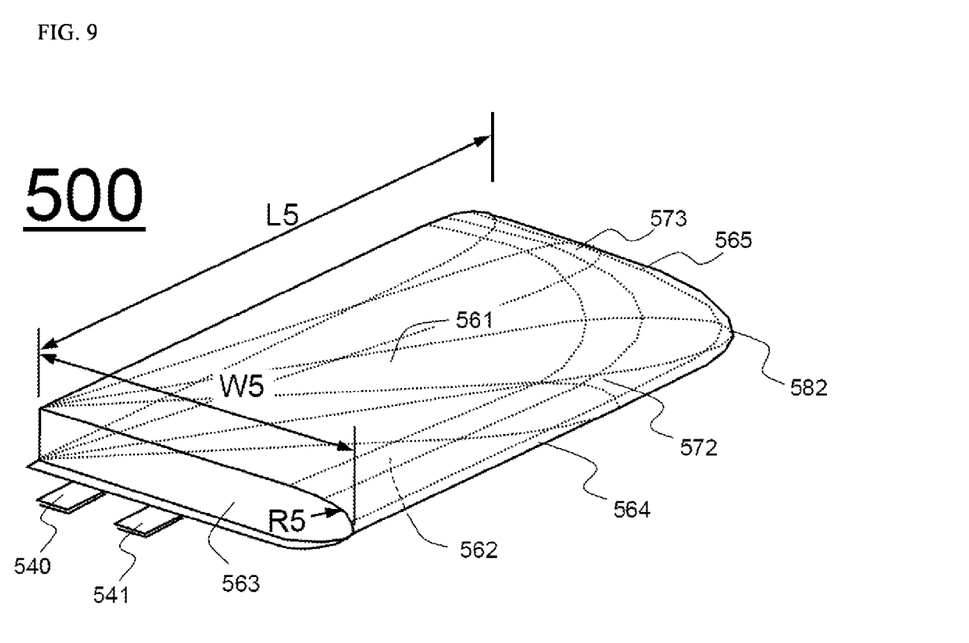

Referring to FIG. 9, a battery cell 500 has electrode terminals 540 and 541 formed at one side face 563 thereof. A round corner R5 is formed at upper edges 572 and 573, lower edges (not shown), and one side edge 582 of the battery cell 500 which are not tangent to one side face 563 at which the electrode terminals 540 and 541 are formed. Consequently, a top face 561, a bottom face 562, and side faces 564 and 565 of the battery cell 500 are connected to each other in a continuously curved form.

Therefore, the embodiments of the battery cell as described above may be stably mounted in an electric device manufactured based on various designs including a curved structure and, in addition, efficiently use the inner space of the electric device.

As a result, the electric device according to the present invention may have a compact structure based on various designs while maintaining more stable and increased electrical capacity as compared with the conventional electric device.

Figure 10:
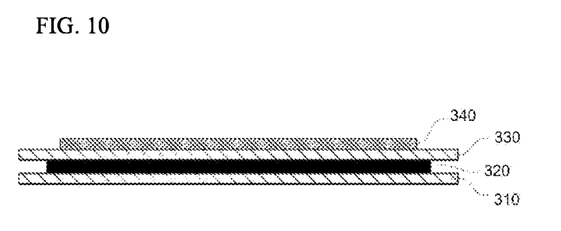
FIG. 10 is a view showing the structure of a first electrode group according to an embodiment of the present invention.

As shown in FIG. 10, a first electrode group is configured to have a structure in which a separator plate 310, a cathode plate 320, a separator plate 330, and an anode plate 340 are laminated while being sequentially stacked.

Figure 11:
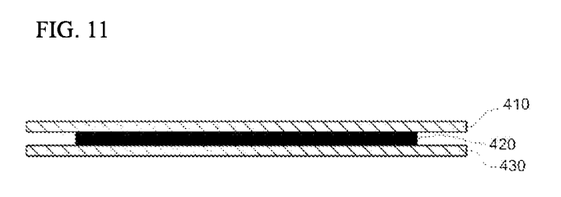
FIG. 11 is a view showing the structure of a second electrode group according to an embodiment of the present invention.

As shown in FIG. 11, a second electrode group is configured to have a structure in which a separator plate 410, an anode plate 420, and a separator plate 430 are laminated while being sequentially stacked.

Figure 12:
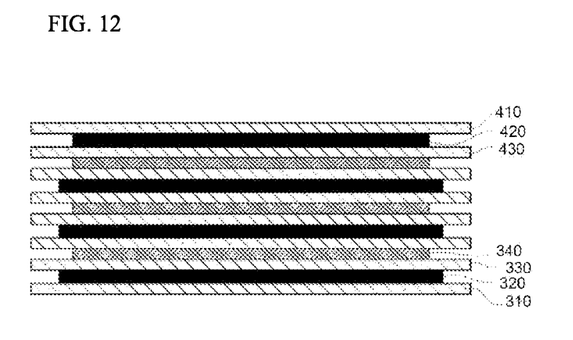
FIG. 12 is a typical view showing a stacked type electrode assembly according to an embodiment of the present invention.

FIG. 12 shows a stacked type electrode assembly configured to have a structure in which the second electrode group of FIG. 11 is stacked on the uppermost end of a first electrode group stack constituted by first electrode groups, one of which is shown in FIG. 10.

Figure 13:
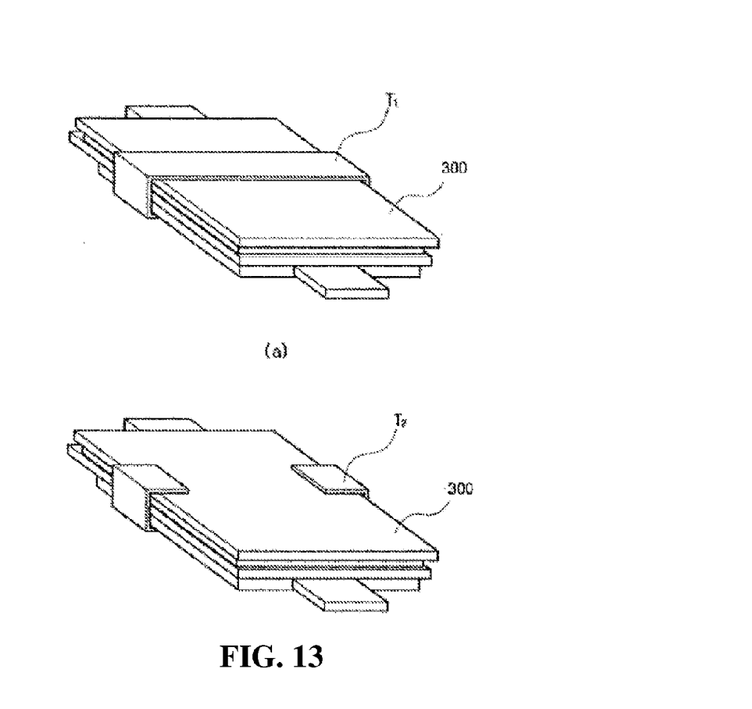
FIG. 13 is a typical view showing a fixing structure of the first electrode group of FIG. 10.

FIG. 13 shows an embodiment in which a fixing member $T_1$ is added to the first electrode group of FIG. 10. Specifically, the fixing member $T_1$ is added to the side or the front of the first electrode group 300.

In order to secure stack stability of a simple stack structure, an additional fixing member may be added to the side of the stack structure to fix the stack structure. The fixing member may be realized as a tape $T_1$ surrounding the entire surface of the first electrode group 300 as shown in FIG. 13(*a*). Alternatively, the fixing member may be realized as a fixing member $T_2$ to fix only each side of the electrode group 300 as shown in FIG. 13(*b*).

Figure 14:
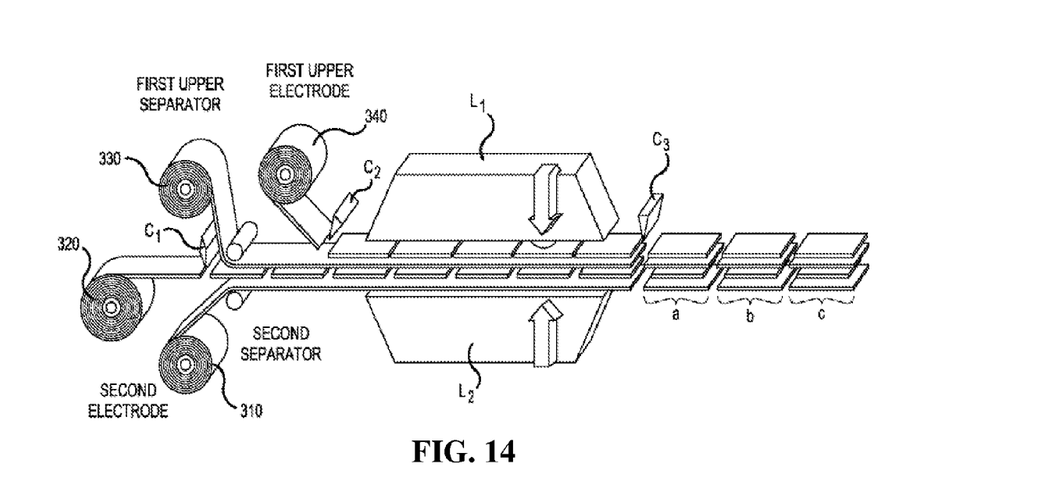
FIG. 14 is a view showing a process of manufacturing a first electrode group according to an embodiment of the present invention.
Figure 15:
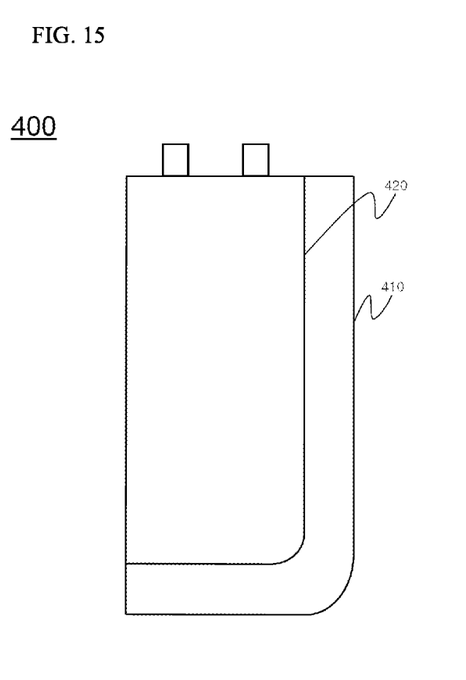
FIG. 15 is a plan view of a battery cell according to a further embodiment of the present invention.

FIG. 14 is a view typically showing a process of manufacturing the first electrode group according to the present invention.

As shown in FIG. 14, materials for a separator plate 310, a cathode plate 320, a separator plate 330, and an anode plate 340 are simultaneously loaded (using sheet type loading units). The material for the cathode plate 320, which is used as a middle layer, is cut into a designed size and is then loaded into laminators $L_1$ and $L_2$. Subsequently, the materials for the separator plates 310 and 330, which are disposed under and above the material for the cathode plate 320, are simultaneously loaded into the laminators $L_1$ and $L_2$. At the same time, the material for the anode plate 340 is loaded into the laminators $L_1$ and $L_2$.

Subsequently, the laminators $L_1$ and $L_2$ form a structural body in which the two electrode plates and the two separator plates are laminated to each other using heat and pressure, i.e. a first electrode group. Subsequently, a cutter $C_3$ cuts the structural body into a plurality of first electrode groups. Afterwards, various inspection processes, such as a thickness inspection (a), a vision inspection (b), and a short circuit inspection (c), may be performed with respect to each first electrode group.

Subsequently, each first electrode group manufactured as described above is fixed using a fixing member, and the first electrode groups are stacked to constitute a structural body in which the first electrode groups are stacked. Subsequently, the second electrode group shown in FIG. 11 is stacked on the structural body and then the second electrode group and the structural body are fixed using a fixing member, thereby completing a stacked type electrode assembly.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the electric device according to the present invention may be manufactured based on various designs including a curved structure and have a secondary battery, the external appearance of which corresponds to the curved structure of the electric device, mounted therein, and therefore, it is possible to efficiently use the inner space of the electric device. Consequently, the electric device according to the present invention may have a compact structure based on various designs while maintaining more stable and increased electrical capacity as compared with a conventional electric device.

The invention claimed is:

1. An electric device having a curved structure formed at at least one position of an outside thereof,
   wherein at least one secondary battery being configured to substantially conform to a shape of the curved structure is mounted at the position of the electric device at which the curved structure is formed,
   wherein the secondary battery is a battery cell having an electrode assembly comprising a cathode, an anode, and a separator disposed between the cathode and the anode mounted in a battery case, or a battery pack having the battery cell mounted in a pack case,
   wherein the battery cell is configured to have a rectangular parallelepiped structure comprising six faces, and comprises a top face and a bottom face, the top face and the bottom face being opposite to each other, four side faces tangent to the top face and the bottom face, four side edges forming interfaces between the respective side faces, four upper edges forming interfaces between the top face and the respective side faces, and four lower edges forming interfaces between the bottom face and the respective side faces,
   wherein a round corner having the shape of the curved structure of the electric device is formed at at least one selected from among the upper edges, the lower edges, and the side edges of the battery cell,
   wherein:
   (1) the battery cell has electrode terminals formed at one side face thereof, and the round corner is formed at one upper edge and at least one side edge of the battery cell which are not tangent to one side face at which the electrode terminals are formed such that the top face and at least one side face of the battery cell are connected to each other in a continuously curved form, or
   (2) the battery cell has electrode terminals formed at one side face thereof, and the round corner is formed at one upper edge, one lower edge, and at least one side edge of the battery cell which are not tangent to one side face at which the electrode terminals are formed such that the top face, the bottom face, and at least one side face of the battery cell are connected to each other in a continuously curved form, and
   wherein the electrode assembly includes a stacked type electrode assembly having plural electrode groups configured to have a structure in which a cathode plate, an anode plate, and separator plates are laminated while being stacked such that the cathode plate or the anode plate and one of the separator plates are located at the outermost sides of the stacked type electrode assembly.

2. The electric device according to claim 1, wherein the round corner has a radius of curvature of 10 mm to 200 mm.

3. The electric device according to claim 1, wherein the round corner has a radius of curvature of 1 mm to 10 mm.

4. The electric device according to claim 1, wherein the round corner has a radius of curvature equivalent to 20% to 100% of a width or a length of the electrode assembly in plane.

5. The electric device according to claim 1, wherein the round corner is formed in a fixed arc shape having one radius of curvature or in a variable arc shape having two or more radii of curvature.

6. The electric device according to claim 1, wherein the battery case is formed of a laminate sheet comprising a metal layer and a resin layer.

7. The electric device according to claim 1, wherein the battery cell is a pouch-shaped battery having an electrode assembly in a pouch-shaped battery case.

8. The electric device according to claim 1, wherein the battery cell is a lithium ion battery cell or a lithium ion polymer battery cell.

9. The electric device according to claim 1, wherein the device is generally configured to have a hexahedral structure and the curved structure is formed at at least one edge thereof.

10. The electric device according to claim 1, wherein the device is selected from among a mobile phone, a portable computer, a laptop computer, a smartphone, a smart pad, a tablet personal computer, a light electric vehicle, an electric vehicle, a hybrid electric vehicle, a plug-in hybrid electric vehicle, and a power storage device.

11. The electric device according to claim 1, wherein the stacked type electrode assembly includes a fixing member to maintain a stack structure of the electrodes groups.

* * * * *